United States Patent
Farrugia et al.

(10) Patent No.: US 9,565,018 B2
(45) Date of Patent: Feb. 7, 2017

(54) PROTECTING CRYPTOGRAPHIC OPERATIONS USING CONJUGACY CLASS FUNCTIONS

(71) Applicant: Apple Inc., Cupertino, CA (US)

(72) Inventors: Augustin J. Farrugia, Cupertino, CA (US); Benoit Chevallier-Mames, Paris (FR); Bruno Kindarji, Paris (FR); Mathieu Ciet, Paris (FR); Thomas Icart, Paris (FR)

(73) Assignee: APPLE INC., Cupertino, CA (US)

( * ) Notice: Subject to any disclaimer, the term of this patent is extended or adjusted under 35 U.S.C. 154(b) by 125 days.

(21) Appl. No.: 14/291,591

(22) Filed: May 30, 2014

(65) Prior Publication Data

US 2015/0349951 A1    Dec. 3, 2015

Related U.S. Application Data

(60) Provisional application No. 62/004,173, filed on May 28, 2014.

(51) Int. Cl.
*G06F 21/00* (2013.01)
*H04L 9/06* (2006.01)
*G09C 1/00* (2006.01)

(52) U.S. Cl.
CPC ............ *H04L 9/0631* (2013.01); *G09C 1/00* (2013.01); *H04L 2209/16* (2013.01); *H04L 2209/603* (2013.01); *H04L 2209/76* (2013.01)

(58) Field of Classification Search
CPC ........ G09C 1/00; H04L 9/0618; H04L 9/0631; H04L 2209/16; H04L 2209/24; H04L 2209/122; H04L 2209/603; H04L 2209/76
USPC ......................................................... 380/28
See application file for complete search history.

(56) References Cited

U.S. PATENT DOCUMENTS

| | | | |
|---|---|---|---|
| 6,920,562 B1* | 7/2005 | Kerr | G06F 9/30003 380/28 |
| 2004/0047466 A1* | 3/2004 | Feldman | H04L 9/0631 380/37 |
| 2004/0165721 A1* | 8/2004 | Sano | H04L 9/002 380/28 |

* cited by examiner

*Primary Examiner* — Yogesh Paliwal
(74) *Attorney, Agent, or Firm* — Adeli LLP

(57) ABSTRACT

Some embodiments provide for an improved method for performing AES cryptographic operations. The method applies a look up table operation that includes several operations embedded within look up tables. The embedded operations include a permutation operation to permute several bytes of AES state, a multiplication operation to apply a next round's protection to the AES state, an affine function and an inverse affine function to conceal the multiplication operation, and an inverse permutation operation to remove a previous round's protection. Some embodiments provide for an optimized method for efficiently performing such protected AES operations. The method alternates rounds of AES processing between software processing (e.g. processing by a CPU, performed according to software instructions) and hardware processing (e.g. processing by cryptographic ASIC).

20 Claims, 12 Drawing Sheets

PROTECTING CRYPTOGRAPHIC OPERATIONS USING CONJUGACY CLASS FUNCTIONS

BACKGROUND

Cryptographic algorithms are widely used for encryption of messages, authentication, encryption signatures and identification. The well-known DES (Data Encryption Standard) has been in use for a long time, and was updated by Triple-DES, which has been replaced in many applications by the AES (Advanced Encryption Standard). AES is an approved encryption standard by the U.S. government. AES is a substitution permutation network. AES is fast enough to execute in both computer software and hardware implementations, relatively easy to implement, and requires little memory space.

FIG. 1 provides a conceptual illustration of an example cryptographic operation 100 using AES. As shown in FIG. 1, input data 140 is processed in an initial round 110, nine middle rounds 120, and a final round 130. After all of the rounds are completed, output state 150 will be produced. When operation 100 is a decryption operation, input data 140 will be cipher text (e.g., encrypted data) and output state 150 will be plain text (e.g., unencrypted data). When operation 100 is an encryption operation, input data 140 can be either cipher text or plain text, and output state 150 will be cipher text (if the input data 140 is cipher text, then the output state 150 will be twice ciphered). Input data 140 can be any computer readable message. For instance, input data 140 could be an encrypted content file, video content, image content, audio content, a computer message, a secure transmission, or any other string of values that can be encoded as bits.

AES has a fixed block size of 128 bits and a key size of 128, 192 or 256 bits. Due to the fixed block size of 128 bits, AES operates on a 4×4 array of bytes (e.g., 16 bytes). Accordingly, input data 140 will always be a 16 byte array of information. Input data 140 can be a sub-portion of a larger message. For instance, a three megabyte audio file can be divided into 16 byte portions and each portion encrypted according to operation 100. During the operations of AES, the input data 140 will be referred to as "AES state". AES state is a 16-byte buffer upon which the AES operations are performed.

AES uses key expansion and like most block ciphers a set of encryption and decryption rounds (iterations). Each round involves similar processes. As shown in FIG. 1, initial round 110, nine middle rounds 120, and final round 130 each contain similar operations (e.g., SubBytes, ShiftRows, MixColumns, and AddRoundKey). The entire AES algorithm (e.g., operation 100) contains 11 AddRoundKey operations, 10 SubBytes operations, 10 ShiftRows operations, and 9 MixColumns operations. Preliminarily to operation 100, the original 16 byte cipher key 155 is expanded to 11 subkeys, during what is called the key-scheduling operation. The 11 subkeys include subkey 0 160, subkeys 1-9 165, and subkey 10 170. The 11 subkeys are each used in different rounds of operation 100. Each subkey is 16 bytes long.

Initial round 110 shows operation 100 receiving input data 140 and performing AddRoundKey operation 115. AddRoundKey operation 115 performs a logical exclusive disjunction operation (hereinafter "XOR") on subkey 0 155 and input data 140. The XOR operation combines input data 140 with subkey 0 155.

Following the initial round 110, operation 100 performs nine middle rounds 120. Each of the nine middle rounds 120 include four operations: SubBytes 121, ShiftRows 120, MixColumns 123, and AddRoundKey 124. SubBytes 121 substitutes the bytes of the current AES state according to a substitution table. This substitution table is sometimes referred to as a substitution box or "SBOX" table. This operation provides non-linearity in the cipher.

ShiftRows 122 cyclically shifts bytes in each row of the AES state by certain offsets. As the AES state is a 4×4 16 byte array, the AES state can be arranged in a 4 row, 4 column arrangement. ShiftRows 122 will shift different rows of the 4×4 AES state by different amounts. For instance, the first row is left unchanged. Each byte of the second row is shifted one to the left. Similarly, the third and fourth rows are shifted by offsets of two and three respectively.

MixColumns 123 combines bytes of the AES state from each column using an invertible linear transformation. MixColumns 123 takes four bytes as input and outputs four bytes, where each input byte affects all four output bytes. MixColumns may be implemented via a table lookup operation. Together with ShiftRows, MixColumns provides diffusion in the cipher.

AddRoundKey 124 combines a round key from subkeys 1-9 165 with the AES state. For each round, a subkey is derived from cipher key 155. Each subkey is the same size as the AES state (e.g., a 4×4 16 byte array). The subkey is combined with the AES state using an XOR operation.

After AddRoundKey 124, the operation 100 then performs additional rounds until only one additional subkey remains (e.g., nine rounds). Once the nine middle rounds 120 are completed, operation 100 performs a final round 130 of operations. The final round 130 includes: SubBytes 131, ShiftRows 132, and AddRoundKey 133. These final operations are the same as those described above in connection with the earlier rounds. Final subkey 10 170 is combined with the AES state to produce output state 140.

The previous description of operation 100 corresponded to the order of operations required to encrypt content. Decryptions operations under AES are substantially similar, but the order of operations is reversed and inverses of the operations are used. The inverse of AddRoundKey is AddRoundKey itself. The inverse of SubBytes is Inverse SubBytes, which is another table look up operation. The inverse of MixColumns is Inverse MixColumns, which is another lookup operation. The inverse of ShiftRows is Inverse ShiftRows, which is another move from one byte location to another. Different versions of AES (e.g., the 256-bit variant) can include different numbers of rounds and different state sizes. For further detail on AES, see the specification for the ADVANCED ENCRYPTION STANDARD (AES), NIST, http://csrc.nist.gov/publications/fips/fips197/fips$^{-1}$97.pdf.

Of note, arithmetic implementations of AES do not provide much security against an attacker recovering a secret key, if the attacker has privileged access to the system implementing the cipher. However, AES is often used in potentially insecure environments. For instance, AES could be employed in a white box environment. In a white box model, it is presumed that an attacker has total access to the system performing an encryption, including being able to observe directly a state of memory, program execution, and so on. In such a model, an encryption key can be observed in or extracted from memory, and so ways to conceal operations indicative of a secret key are important. For example, the attacker can learn the secret key of an AES software implementation by observing the execution of the Key Schedule algorithm.

DRM applications are one instance where it's desired to keep the attacker from finding the secret key even though the attacker has complete control of the execution process. Chow et. al. (Stanley Chow, Philip A. Eisen, Harold Johnson, Paul C. van Oorschot: White-Box Cryptography and an AES Implementation. Selected Areas in Cryptography 2002: 250-270) give a construction of the AES algorithm for such white box model. The security of this construction resides in the use of table lookups and masked data. The input and output mask applied to this data is never removed along the process. In this solution, there is a need for knowing the key value at the compilation time, or at least to be able to derive the tables from the original key in a secure environment.

However, this solution does not solve all the application's needs for block cipher's encryption. Indeed, the case where the key is derived through a given process and then unknown at the compilation time is not included. One typical use-case is when a program is distributed over several users and each of them has their own key. In this case, it is impossible to disseminate different code to each user from a practical point of view. Another use-case is just when generating session keys (different for each session) through a given process. Of course, in this case the key is unknown at compilation time. A last case is when it is necessary to store a plenty of keys. However, it is not reasonable to consider storing around 700 kB for each key.

BRIEF SUMMARY

Some embodiments provide for an improved method for performing AES cryptographic operations. This improved method ensures that AES state being operated on over the rounds of an AES cryptographic operation is protected between rounds. In some embodiments, the protection is a multiplication function initially applied in a first round of the AES cryptographic operation. Within the middle rounds of the AES cryptographic operation, the method applies a look up table operation that includes several operations embedded within look up tables. The embedded operations of some embodiments include a permutation operation to permute several bytes of AES state, a multiplication operation to apply a next round's protection to the AES state, an affine function and an inverse affine function to conceal the multiplication operation, and an inverse permutation operation to remove a previous round's protection.

Some embodiments provide for an optimized method for efficiently performing such protected AES operations. The method alternates rounds of AES processing between software processing (e.g. processing by a CPU, performed according to software instructions) and hardware processing (e.g. processing by cryptographic ASIC). The alternating method initially applies protection functions during a first software processing round, and maintains protection of the AES state as it alternates between software processing and hardware processing. Such operations allow the device performing the cryptographic function to maintain additional protection while at least partially realizing the performance benefits of using hardware specifically devoted to performing cryptographic functions.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

Figure 1:
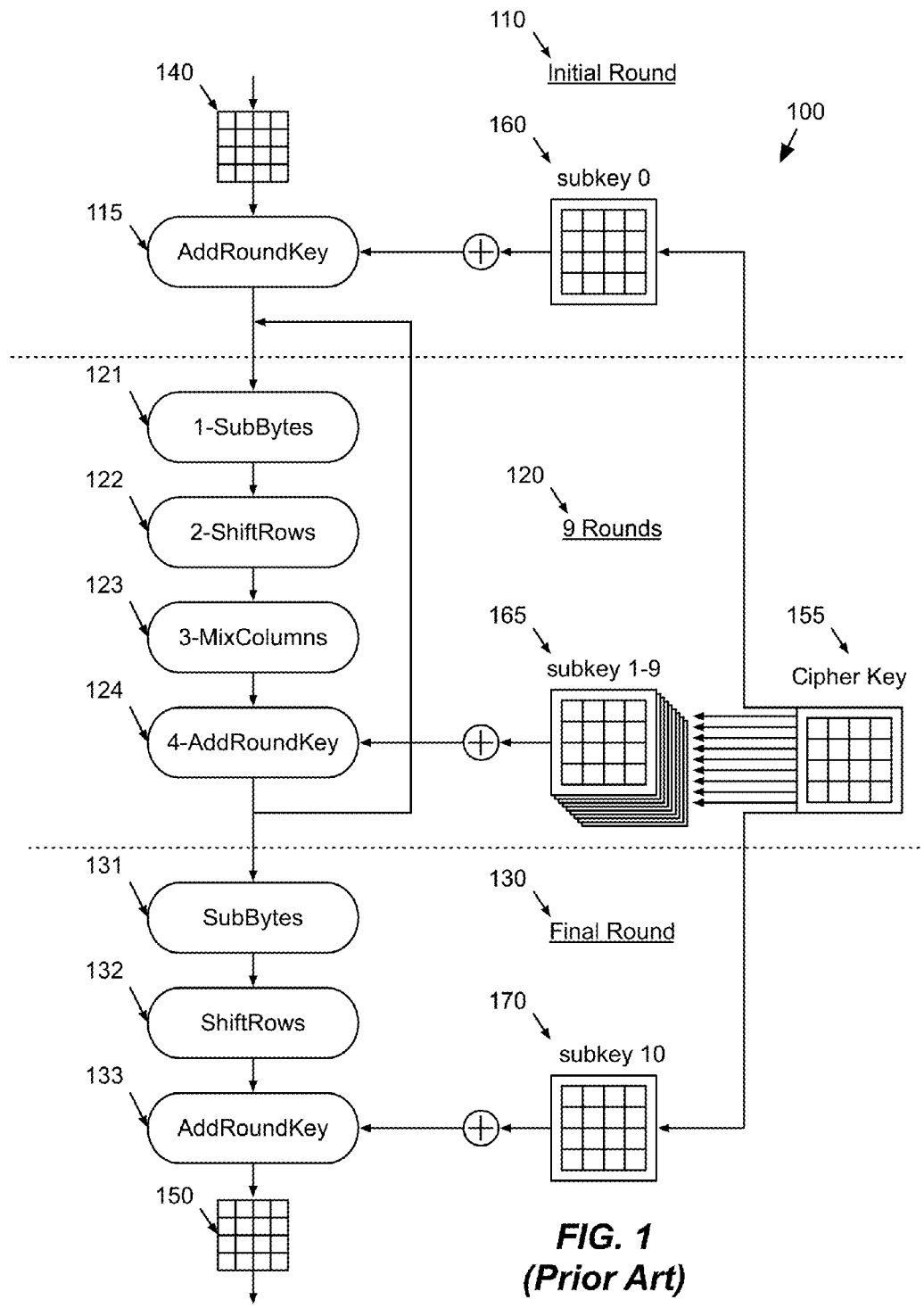
FIG. 1 conceptually illustrates the AES encryption system.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide novel improvements to AES. Specifically, the invention ensures that data upon which AES is being applied (i.e., the AES state) is not observable without a protection function applied to said data. Embodiments of the invention accomplish this by taking advantage of properties of certain operations of AES. For instance, table look up operations can be pre-computed to take advantage of conjugacy functions for some operations of AES (e.g., SubBytes, AddRoundKey, MixColumns). Applying these pre-computed table operations during AES will result in the AES state and the operations being performed on it being harder to observe in a white box environment.

Some embodiments provide for an improved method for performing AES cryptographic operations. This improved method ensures that AES state being operated on over the rounds of an AES cryptographic operation is protected between rounds. In some embodiments, the protection is a multiplication function initially applied in a first round of the AES cryptographic operation. Within the middle rounds of the AES cryptographic operation, the method applies a look up table operation that includes several operations embedded within look up tables. The embedded operations of some embodiments include a permutation operation to permute several bytes of AES state, a multiplication operation to apply a next round's protection to the AES state, an affine function and an inverse affine function to conceal the multiplication operation, and an inverse permutation operation to remove a previous round's protection.

However, such pre-computed table operations must be executed in software processing environments (e.g., by a computing device's CPU) because hardware processing systems (e.g., cryptography ASICs) have only limited ranges of instructions that do not include the pre-computed table operations. Embodiments of the invention provide novel techniques for enhancing the processing efficiency of protected AES operations that use pre-computed table operations. Protected AES operations are contrasted with standard AES operations. Protected AES operations conceal the operations via permutations, multiplications, masks, and other techniques described herein. Some embodiments divide the processing of protected AES operations between software processing systems (e.g., those computed by CPUs) and hardware processing systems (e.g., those computed by cryptography ASICs). The protected AES operations described herein are typically not implemented in cryptography ASICs. Accordingly, by dividing the processing of AES operations between software processing systems and hardware processing systems embodiments of the invention can maximize the use of the fastest available computing resources while also enhancing the protection of the cryptographic operations.

Figure 2:
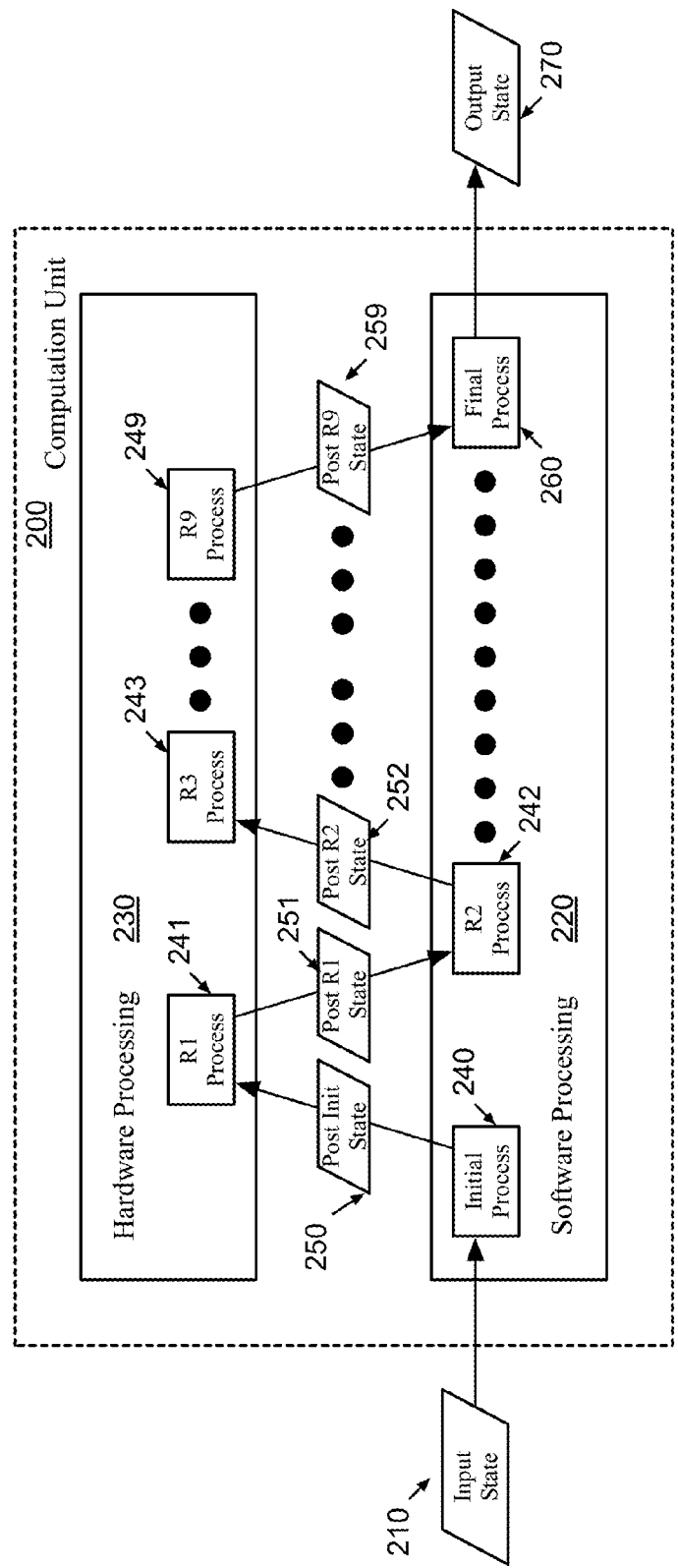
FIG. 2 conceptually illustrates an example processing of AES state that alternates between software processing and hardware processing.

FIG. 2 conceptually illustrates an example processing of an input state 210 using both software processing 220 and hardware processing 230 of a computation unit 200 (e.g., a device, a portion of a device, etc.). In some embodiments, input state 210 is a 4×4 16 byte array of values that is repeatedly operated on over several rounds of AES operations. In different embodiments, the input state 210 may be a portion of media content (e.g., video, audio, image, etc.), executable data, data for transmission over a network, or other content, in either encrypted or unencrypted form.

Input state 210 is initially processed by an initial process 240 in software processing 220. In this initial processing, modified protection functions are embedded into the AES processing. In some embodiments, these modified protection functions cannot be performed in hardware processing 230 due to semantic differences between the modified protection functions and the base set of instructions available in hardware processing 230. This initial processing 240 corresponds to the initial AddRoundKey operation (e.g., with subkey 0) performed during an initial round of AES encryption. This results in post initial state 250. Post initial state 250 includes the protection functions from the software processing 220. As result of this additional protection, post initial state 250 is hardened against memory tracing and other similar white box attacks. The computation unit 200 may be an insecure user device held by a potential attacker in some embodiments.

Hardware processing 230 then receives the post initial state 250 and applies R1 (i.e. Round 1) processing 241 to the post initial state 250. R1 processing 241 corresponds to the first round of the middle rounds of AES processing. R1 processing 241 would use subkey 1 when performing AES encryption. R1 processing 241 of some embodiments applies no modified protection schemes when performing AES operations because hardware processing 230 lacks such instructions. However, embodiments of the invention provide for protection schemes that do not alter the AES operations in a way that would prevent computation of a next round of AES operations in a manner that ignores such protection schemes. The resulting post R1 state 251 will retain the protections of post initial state 250.

Upon receiving post R1 state 251, R2 processing 242 will apply a composition of both a removal function and a protection function to post R1 state 251 in generating post R2 state 252 along with the standard AES operations. This composition will remove the protection applied during initial processing 240 and apply further protection so that later processing will remain protected. The specific details of this composition will be discussed below in Section II. Processing will alternate between software processing 220 and hardware processing 230 until final processing 260 in software. Final processing 260 will apply a last round of AES operations and a final protection removal function to generate output state 270. Output state 270 will be the expected result from a standard AES operation on input state 210, but will be protected between rounds via protection functions different from standard AES, yet also be computed faster than a purely software computation thanks to use of hardware processing where possible.

Many more details of embodiments of the protection functions and their implementations will be discussed below. Section I describes useful properties of a substitution table (i.e., SBOX) of the SubBytes operation of AES. Section II then describes protection functions that take advantage of the described properties of SBOX. Section III then describes in detail the implementation of protection functions using both hardware and software processing resources. Finally, Section IV describes an electronic system with which some embodiments of the invention are implemented.

I. Properties of Subbytes Operation

Some embodiments define functions that are part of a conjugacy class of functions for the SubBytes operation of AES. These conjugacy class functions are useful in pre-computing protected table operations for AES. In order to assist in understanding these conjugacy class functions, a general description of what a conjugacy class function is will follow.

As an example, let "F" be a function from a set "R" to itself. For example, set R could be a finite field of a given number of elements, such as a subset of the real numbers. The conjugacy class of F is the set made of all the functions $\{Q^{-1} \circ F \circ Q\}$ for all Q being a bijection from R to R. A bijection is a function between the elements of two sets, where every element of one set is paired with exactly one element of the other set, and every element of the other set is paired with exactly one element of the first set. There are no unpaired elements.

Some embodiments of the invention take advantage of a property of this class of functions. For any Q, the following conjugacy relationship holds:

$$Q \circ (Q^{-1} \circ F \circ Q) = F \circ Q$$

This identity provides a useful security property. Assume that it is desired to compute the function Q(X) in a masked way. Taking advantage of the above identity, one can then compute Y as:

$$Y = (Q^{-1} \circ F \circ Q)(x)$$

Then compute Q(Y):

$$Q \circ Y = Q \circ (Q^{-1} \circ F \circ Q)(x)$$

However, Q∘Y is equal to F∘Q(X) because Q∘(Q$^{-1}$∘F∘Q)=F∘Q as mentioned above. Then, F∘Q(X) can be seen as Q(X) protected by the function F. In this case, the value to be protected (Q(X)) is never visible in memory without protection during the computation. Embodiments of the invention can use this protection to conceal the operations of AES (e.g., SubBytes, MixColumns, and AddRoundKey). For instance, when Q is the AES SBOX (hereinafter alternatively referred to as "S"), on the 8-bit Galois Field (hereinafter "GF(256)"). As SBOX is a one to one mapping from possible input values to possible output values, SBOX is a bijection. This bijective quality enables conjugacy class functions to be computed for SBOX as described above. Before detailing further properties and useful techniques for concealing AES operations involving the AES SBOX, an example lookup operation using the SBOX will be discussed below.

Figure 3:
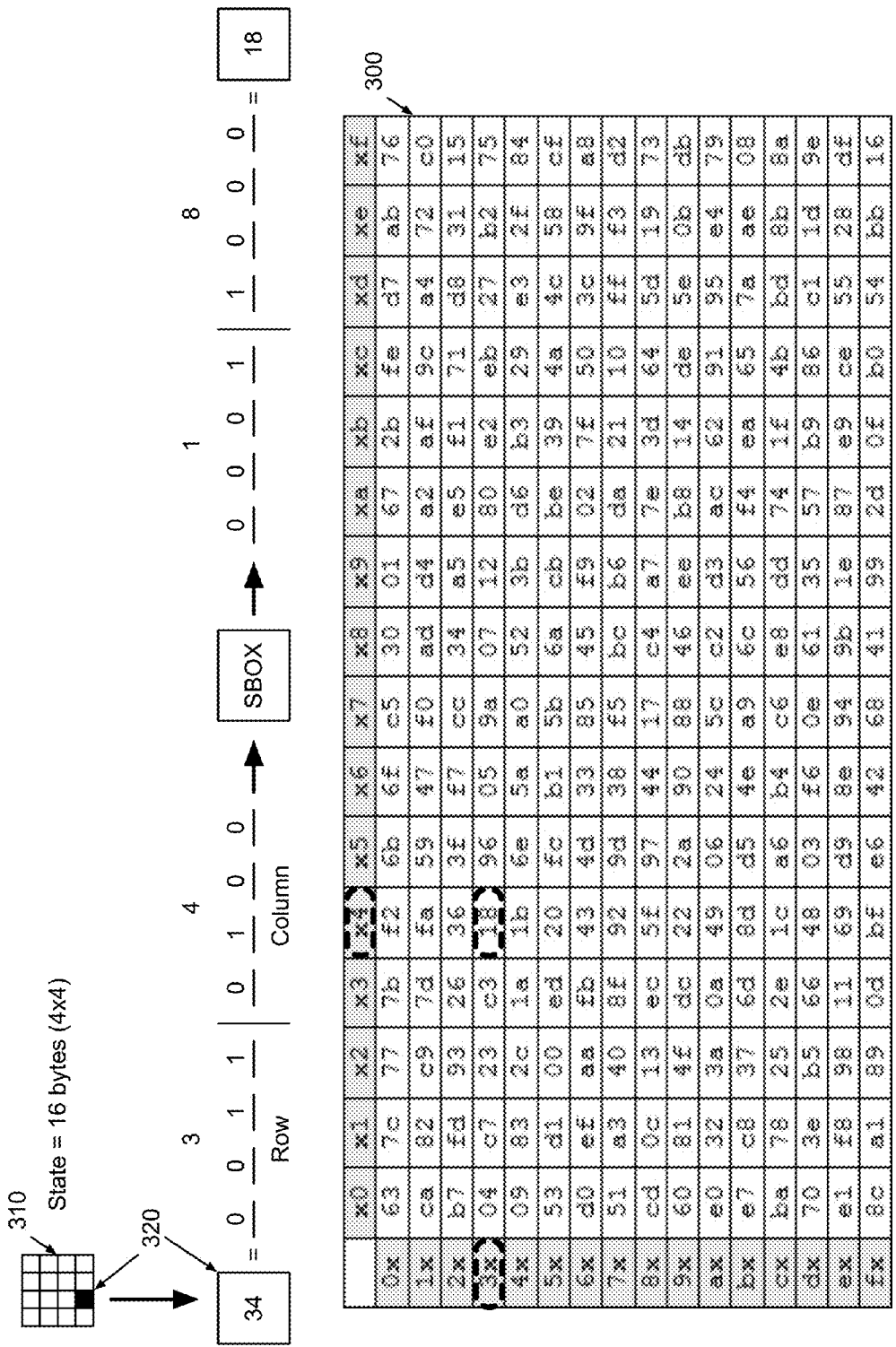
FIG. 3 conceptually illustrates the SBOX table of AES.

FIG. 3 conceptually illustrates SBOX table 300 of AES. SBOX table 300 is the substitution box for Rijndael's implementation of AES. SBOX table 300 is used in a SubBytes operation to substitute bytes of AES state according to the values contained in the SBOX table. SBOX table 300 includes columns and rows of hexadecimal values. The left most column is for matching up with a left nibble in a byte. The top most row is for matching up with a right nibble in a byte. The left nibble of a byte of AES state will be substituted according to its matching value in the left most column. The right nibble of a byte of AES state will be substituted according to its matching value in the top most row. A nibble is equal to 4 bits. Two nibbles make up one byte of information.

AES state 310 is provided as an example state to be looked up in SBOX table 300. AES state 310 is a conventional 4×4 16 byte array of values. Byte 320 is highlighted in AES state 310. Byte 320 has a hexadecimal value of 34. The left nibble of byte 320 is 3. As circled in SBOX table 300, the left nibble matches with 3x in the left most column. The right nibble of byte 320 is 4. As circled in SBOX table 300, the right nibble matches with x4 in the top most column. These matches correspond to "18" as circled in SBOX table 300. Accordingly, byte 320 will be substituted to 18 during a SubBytes operation that uses SBOX table 300. Different input values will yield different output values on SBOX table 300.

The SBOX (i.e., "S") was defined by the AES authors as:

$$S = A \circ \text{Inv}$$

"A" is an affine operation over GF(256) and "Inv" is the inversion of GF(256). S is used in AES encryption. For decryption ISBOX (i.e., "IS") is used and is defined as:

IS=Inv$^{-1}$∘A$^{-1}$=Inv∘A$^{-1}$; as the inversion (Inv) is its own inverse, Inv is also present in the definition of IS. From S and IS, a first SBOX property can be derived.

A. First SBOX Property: Conjugate Protection for Encryption

Start with an example function "F". Let F be a permutation on GF(256). When S and S$^{-1}$ are applied to F as a conjugacy class, the following identity holds:

$$S^{-1} \circ F \circ S = IS \circ F \circ S$$

This is true because IS=S$^{-1}$ as mentioned above. From this identity, the following expansion using conjugacy classes can be derived:

$$IS \circ F \circ S = \text{Inv} \circ A^{-1} \circ F \circ A \circ \text{Inv}$$

This identity is true because, as mentioned above, IS=Inv∘A$^{-1}$ and S=A∘Inv. Now assume that F is A∘M_i∘A$^{-1}$ where M_i is the multiplication by i in GF(256), i being invertible i.e. not zero. The equation then becomes:

$$S^{-1} \circ F \circ S = (\text{Inv} \circ A^{-1}) \circ (A \circ M\_i \circ A^{-1}) \circ (A \circ \text{Inv})$$

$$= \text{Inv} \circ M\_i \circ \text{Inv}$$

The two pairs of A$^{-1}$ and A functions cancel each other out, along with the "Inv" operations. M_(1/i) is the multiplication by 1/i. Multiplication in the Galois field (e.g. GF(256) can be the basis for protecting state. Assume that a byte X is protected using a permutation M_(1/i)=S$^{-1}$∘A∘M_i∘A$^{-1}$∘S, which is a linear function because it is a multiplication. If S is applied on this protected byte, the equation becomes:

$$S(M\_(1/i)(X)) = S \circ S^{-1} \circ A \circ M\_i \circ A^{-1} \circ S(X)$$

$$= A \circ M\_i \circ A^{-1} \circ S(X)$$

This proves that after the application of the SBOX on the protected byte X, the resulting byte Z will be equal to:

$$Z = (A \circ M\_i \circ A^{-1}) \circ S(X)$$

Z is the byte that is desired to be computed in AES. E.g., Z is S(X) protected by the affine function (A∘M_i∘A$^{-1}$). As a result of this protection, the computation of byte Z will never be in the clear (e.g., not visible to memory tracing programs in a white box environment). (A∘M_i∘A$^{-1}$) is an affine function (e.g., linear function with XOR a constant) that applies on bytes. Recall that (A∘M_i∘A$^{-1}$)=F as discussed above. This protection can be generalized to the case of decryption, as will be discussed below.

B. Second SBOX Property: Conjugate Protection for Decryption

In order to protect decryption AES operations, functions can be derived that conceal these decryption operations using properties of SBOX and ISBOX. Let F be a permutation on GF(256), where F=(A∘M_i∘A$^{-1}$). Applying IS (i.e., ISBOX) to F as a conjugacy class results in the following identities:

$$IS^{-1} \circ F \circ IS = S \circ F \circ IS = (A \circ \text{Inv}) \circ F \circ (\text{Inv} \circ A^{-1})$$

The previous identities hold because IS$^{-1}$=S by inversion, and because IS=Inv∘A$^{-1}$ as was described above. In the special case where F is a multiplication (M_i), the following identities hold true:

$$IS^{-1} \circ F \circ IS = A \circ \text{Inv} \circ M\_i \circ \text{Inv} \circ A^{-1} = A \circ M\_1/i \circ A^{-1}$$

As in the previous subsection, this means that if a byte X is protected using the affine operation A∘M_1/i∘A$^{-1}$ (Y=A∘M_1/i∘A$^{-1}$(X)), computing IS(Y) leads to:

$$IS(A \circ M\_1/i \circ A^{-1}(X)) = IS(S \circ F \circ IS(X)) = F \circ IS(X) = M\_i \circ IS(X)$$

Similarly to the encryption case above, the decryption protection will ensure that Y is never viewable in the clear.

The final value, M_i∘IS(X), will yield an output state with the multiplication protection removed (due to M_i) and the substitution box operation reversed (due to IS(X)). That SBOX and ISBOX can be protected using conjugacy class functions yields further advantages that will be discussed next.

C. Third SBOX Property: Powers of SBOX Protecting AES

The SubBytes operation is usually performed using a table lookup operation on bytes of AES state. These tables are herein referred to as SBOX tables. An SBOX tables is a bijection from [0, 255] to [0, 255]. As such, it is a permutation, whose power will be noted SBOX^I ("^" is used to indicate "taken to the power of"). Let SBOX^i be defined on a byte X as (where the "IdentifyOf" function yields the identity of an input):

$SBOX\widehat{\ }0[X]=X=\text{IdentityOf}[X]$,

And for all "i" not equal to 0:

$SBOX\widehat{\ }I[X]=SBOX[SBOX[\ldots SBOX[X]]]$ (i applications of SBOX table lookups).

Figure 4:
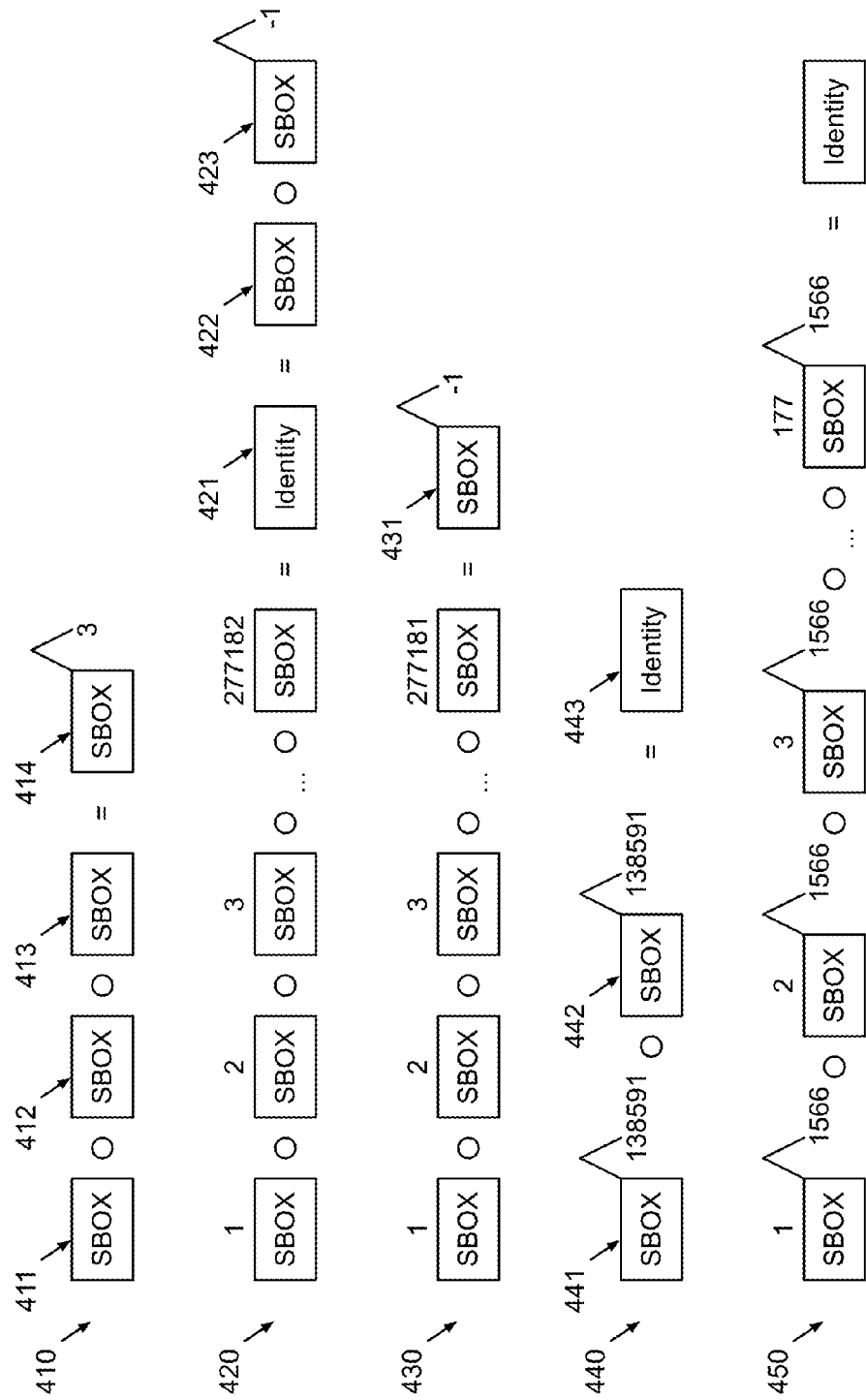
FIG. 4 conceptually illustrates examples associated with several properties of the SBOX table of AES.

FIG. 4 provides a conceptual illustration of several examples to support the explanation of this third SBOX property. Each SBOX in the examples shown in FIG. 4 correspond to the SBOX table 300 shown in FIG. 3. As shown in FIG. 4, example 410 shows SBOX 411∘SBOX 412∘SBOX 413 being equal to SBOX^3 414.

The set of all SBOX^i (and ISBOX^i) is an algebraic group. The algebraic group for SBOX^i and the algebraic group for ISBOX^i both have the following property: their elements commute for all i (this is also valid for ISBOX). This means that for all X, for all i, for all k, the following identities hold:

$SBOX\widehat{\ }i[SBOX\widehat{\ }k[X]]=SBOX\widehat{\ }k[SBOX\widehat{\ }i[X]]$ $SBOX\widehat{\ }i[ISBOX\widehat{\ }k[X]]=ISBOX\widehat{\ }k[SBOX\widehat{\ }i[X]]$ $ISBOX\widehat{\ }i[SBOX\widehat{\ }k[X]]=SBOX\widehat{\ }k[ISBOX\widehat{\ }i[X]]$ $ISBOX\widehat{\ }i[ISBOX\widehat{\ }k[X]]=ISBOX\widehat{\ }k[ISBOX\widehat{\ }i[X]]$ In particular, for k=1, the following useful equalities can be derived:

$SBOX\widehat{\ }i[SBOX[X]]=SBOX[SBOX\widehat{\ }i[X]]$ $SBOX\widehat{\ }i[ISBOX[X]]=ISBOX[SBOX\widehat{\ }i[X]]$ $ISBOX\widehat{\ }i[SBOX[X]]=SBOX[ISBOX\widehat{\ }i[X]]$ $ISBOX\widehat{\ }i[ISBOX[X]]=ISBOX[ISBOX\widehat{\ }i[X]]$ Because of SBOX's commutative properties, the composition of powers of the SBOX table can be computed as follows:

$SBOX\widehat{\ }(i+k)[X]=SBOX\widehat{\ }i[SBOX\widehat{\ }k[X]]$

Note that these properties are general to any permutation table T and its inverse IT and can be reused in any cipher that uses tables in its implementation. Some embodiments may use a different table than the AES SBOX table for substitution operations. In addition, some embodiments may use a different table for a different function than substitution. These properties allow for construction of SBOX tables to protect inputs and outputs of SBOX and/or ISBOX tables.

As an example of such protection, let "X" be a value and assume Y=SBOX [X] is the operation that must be computed. For instance, X may be a first round of AES state and Y may be a second, next round of AES state derived from the first round of AES state using the SBOX table. To protect data involved in this operation, the commutativity property of SBOX can be used to define conjugacy class functions that conceal the operation as follows:

$X'=SBOX\widehat{\ }i[X]$ $Y'=SBOX[X']$ $Y=ISBOX\widehat{\ }i[Y']$

Here, the input/output (X', Y') of the SBOX are different from the original value (X, Y). However, the conjugacy class functions ensure that the actual SBOX (e.g. SBOX^1) operation is performed on protected values (X', Y'). Assume that F is SBOX^i, in that case, the following identity holds because a power of SBOX commutes with SBOX:

$ISBOX^{-1} \circ F \circ SBOX = ISBOX^{-1} \circ SBOX\widehat{\ }i \circ SBOX = SBOX\widehat{\ }i$ As for the other properties of SBOX, this enables the protection of a byte X with SBOX^i and to ensure that after an application of SBOX on the protected byte, that SBOX^i is applied to SBOX(X). Several useful protection properties can be derived from the above described properties. For instance, combining the commutativity property of SBOX with knowledge that SBOX^(277182) is the identity table (e.g. for any X, X=SBOX^(277182) [X]). This is defined as the cycle length of the SBOX tables (e.g., 277182 applications of the SBOX table in a cycle yields the starting value). Similarly, ISBOX (the inverse of SBOX) to the power of 277182 is the identity table. Example 420 as shown in FIG. 4 conceptually illustrates the relationship between SBOX and its cycle length. As shown, 277182 compositions of SBOX yields identity table 421. As mentioned above, the identity table, when applied to a value X, will yield the value X. The identity table can be alternatively reached by composing SBOX 422 with SBOX$^{-1}$ 423 as shown in FIG. 4. However, when one less SBOX is composed into the composition (e.g., without SBOX 422), the result will be only SBOX$^{-1}$ 423. This is graphically illustrated in example 430 where 277181 SBOX tables are composed to reach a result of SBOX$^{-1}$ 431. Accordingly, ISBOX is equal to SBOX^(277181).

Further protection schemes can be derived from the cycle length value 277182. The value 277182 can be factorized as follows:

$277182 = 2*(3\widehat{\ }4)*29*59$

This is the prime factorization of 277182, which indicates that 277182 has numerous divisors. These divisors can be combined into various factorizations that can be used to protect input and output of SBOX table operations. Example 440 of FIG. 4 illustrates one potential factorization of a 277182 cycle length SBOX composition. As shown, SBOX^138591 441∘SBOX^138591 442=identity 443 since 138591 is 277182 divided by 2. In order to demonstrate additional identities that result from this factorization, let SBOX'=SBOX^(138591) and ISBOX'=ISBOX^(138591). The following derivations hold for all X:

$$SBOX'[SBOX'[X]] = SBOX\widehat{\ }(138591)[SBOX\widehat{\ }(138591)[X]]$$
$$= SBOX\widehat{\ }(138591 + 138591)[X]$$
$$= X$$

This means that SBOX' and ISBOX' are equal (e.g., SBOX^(138591) and ISBOX^(138591) are equal). This result should be expected as 138591 is halfway through the SBOX cycle length of 277182. However, this particular factorization is not the only possible factorization that could be used in protecting SBOX. For all X and Y, such that Y=SBOX[X] the following protection scheme can be used:

$$X'=SBOX'[X]$$

$$Y'=SBOX[X']$$

$$Y=SBOX'[Y']$$

However, when using such a scheme, if any arbitrary number from 1 to 277182 could be chosen then the number of tables needed to be stored would be impractical for many applications. The numbers of needed tables to be stored can be reduced substantially by using a different factorization. In the previous example, 2 was used as a divisor of 277182. This principle can be easily extended to another divisor as for instance 1566 since 277182=1566*177. Example 450 in FIG. 4 provides a visualization of this second factorization. In this second factorization, Let SBOX"_i for i in {1, . . . , 176} as:

$$SBOX''\_i = SBOX\hat{\ }(1566 * i)$$

Given theses tables, Y=SBOX[X] can be computed, for any i in {1, . . . , 176}:

$$X'=SBOX''\_i[X]$$

$$Y'=SBOX[X']$$

$$Y=SBOX''\_\{177-i\}[Y']$$

Using 1566 as a divisor allows for only 176 tables to be needed to be stored (instead of 277182 which would be too much). Any of the 176 tables could be chosen as a means to protect input/output of the SBOX. This means that an attacker would have to account for any number of possible substitution permutations protecting the AES state, not just the standard SBOX table. Additionally, different factorizations provide even more complexity for a potential attacker to decipher.

Figure 5:
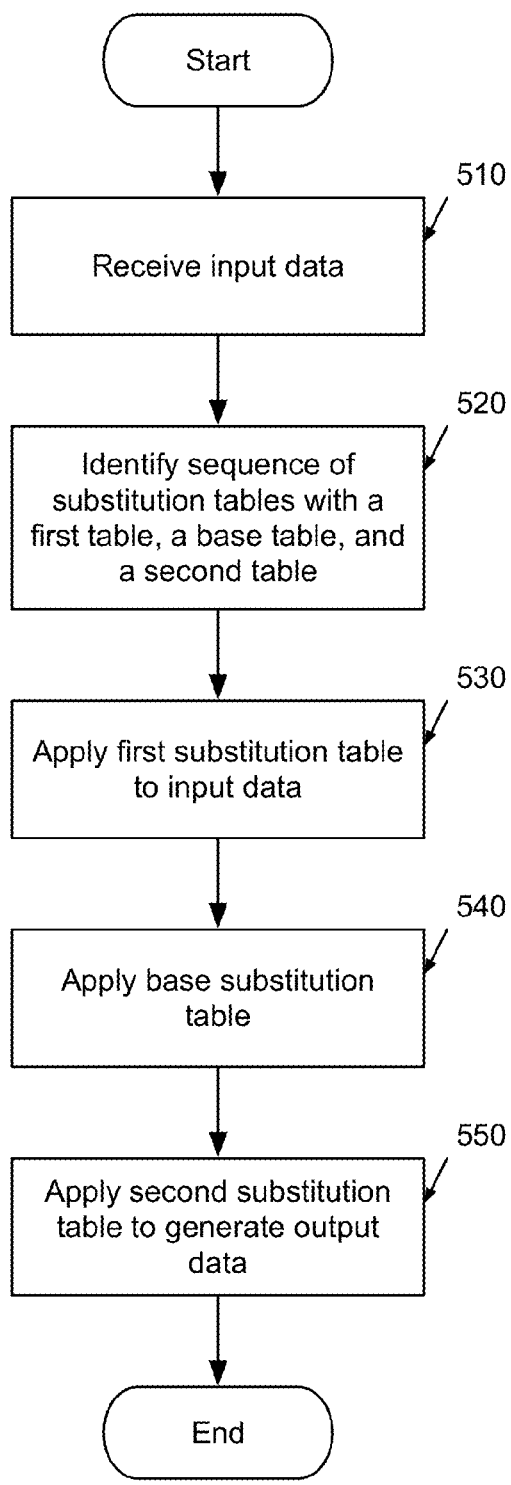
FIG. 5 conceptually illustrates a process for applying a sequence of substitution tables (SBOX tables) in an AES operation.

FIG. 5 conceptually illustrates a process 500 for performing a SubBytes operation using the factorized substitution tables described above. Process 500 begins by receiving (at 510) input data (X). The input data could be any type of data that can be encrypted or decrypted, such as video, audio, messages, characters, or any other bit-encodable data. In some embodiments, the input data is AES state that is output from previous AES operations (e.g., MixColumns, ShiftRows, or AddRoundKey).

Next, process 500 identifies (at 520) a sequence of substitution tables with a first table, a base table, and a second table. This sequence of substitution tables corresponds to SBOX"_i, SBOX, and SBOX"_{177-i} from the example above. The process 500 then applies (at 530) the first substitution table to the input data (SBOX"_i[X]). This generates a first intermediate result (X'). The process 500 then applies (at 540) the base substitution table to the first intermediate result (SBOX [X']). This will generate a second intermediate result (Y'). The process then applies (at 550) a second substitution table to the second intermediate result to generate an output result (SBOX"_{177-i} [Y']). Through this process, embodiments of the invention can protect either encryption or decryption using any selected SBOX from a range of SBOX factorizations. The advantage is that this breaks statistical analysis tools that may be used to attack a whitebox AES implementation because the same instruction in the final binary may be working with a byte that has different protection: one of the SBOX"_i. While the above examples were discussed in terms of SBOX, several of these techniques can be generalized to MixColumns.

D. Generalization of Properties to MixColumns

MixColumns is one of the atomic operations of AES. It is a linear operation that acts on a column of the AES state, when it is seen as a 4×4 matrix. In addition to being linear, MixColumns is made by design as a combination of multiplication. Let (X0, X1, X2, X3) be an AES column, MC(X0, X1, X2, X3) is a vector (Y0, Y1, Y2, Y3) defined as:

$$Y0=L_{00} \cdot X0 \oplus L_{01} \cdot X1 \oplus L_{02} \cdot X2 \oplus L_{03} \cdot X3$$

$$Y1=L_{10} \cdot X0 \oplus L_{11} \cdot X1 \oplus L_{12} \cdot X2 \oplus L_{13} \cdot X3$$

$$Y2=L_{20} \cdot X0 \oplus L_{21} \cdot X1 \oplus L_{22} \cdot X2 \oplus L_{23} \cdot X3$$

$$Y3=L_{30} \cdot X0 \oplus L_{31} \cdot X1 \oplus L_{32} \cdot X2 \oplus L_{33} \cdot X3$$

Each of the $L_{ij}$ values (e.g. $L_{00}$, $L_{13}$, $L_{33}$ etc.) are constants defined in the AES specification. The inverse MC (denoted IMC), used in the decryption, can be defined in the same way. Thanks to this design, MC and IMC commute with multiplication. The computation of MC(L·X0, L·X, L·X2, L·X3), results in (L·Y0, L·Y1, L·Y2, L·Y3). The next section will detail the use of MixColumns (MC), AddRoundKey (ARK), and SubBytes (SBOX) in connection with Conjugacy Classes to protect AES.

II. Conjugacy Classes and General AES Protection

Embodiments of the invention define conjugacy class functions to protect the operations of AES. As mentioned above, AES is a repetitive sequence of the following operations: SubBytes, ShiftRows, MixColumns, and AddRoundKey. For purposes of discussion, the standard operations of AES will herein be referred to as "standard AES". Standard AES includes no additional modifications and performs the normal rounds of operations. Embodiments of the invention define protection functions such that if a standard AES round is applied on a protected state, the resulting protected state will be the expected cryptographic result from the standard AES round operations with protection applied.

Assume that F is a linear permutation P. As explained in U.S. Pat. No. 8,644,500, which is incorporated herein by reference, each of AddRoundKey, ShiftRows, and MixColumns are compatible with an XOR mask and linear permutation masking techniques. Assume that the AES state is protected with $S^{-1} \circ P \circ S$. After applying a standard SBOX operation (i.e., applying S to the state as shown below), the state will be protected with P:

$$S \circ (S^{-1} \circ P \circ S) = P \circ S$$

Recall that MixColumns (i.e. MC) commutes with multiplication in the same manner that SubBytes (i.e. S or SBOX) does. Accordingly, the following identity will hold:

$$P = MC \circ P \circ MC^{-1}$$

Therefore, applying a standard MixColumns operation to this resulting state (e.g., applying MC to P∘S) will yield the following:

$$MC \circ (P \circ S) = (MC \circ P \circ MC^{-1}) \circ MC \circ S$$

This means that after a standard AES round (e.g., a round after both MC and S have been applied to the state), the state is protected with the function $(MC \circ P \circ MC^{-1})$. This is a 4 byte linear function. Accordingly, by pre-computing $(MC \circ P \circ MC^{-1})(Subkey)$, one can XOR this pre-computed value to the current state. The resulting state is the protected state after the AddRoundKey step.

Then the (MC∘P∘MC$^{-1}$) has to be removed. In addition, in order to apply the next round of protection, S$^{-1}$∘P∘S must be applied before the next AES round to maintain protection during the whole AES process. One of the drawbacks of this protection scheme is that, in any implementation, two steps are needed to enable this transition. First: removing (MC∘P∘MC$^{-1}$). Second: applying S$^{-1}$∘P∘S. Since AES has a 16 byte state, this will require 32 table look up operations (hereinafter "TLUs"). These operations will take the following form. In order to remove (MC∘P∘MC$^{-1}$), one can apply:

$$Q\circ(MC\circ P\circ MC^{-1})^{-1} = Q\circ MC\circ P^{-1}\circ MC^{-1}$$

Removing (MC∘P∘MC$^{-1}$) in this fashion keeps protection (e.g. Q) on the state. Then one can apply S$^{-1}$∘P∘S∘Q$^{-1}$ to apply the new protection and to remove Q. These properties can be combined with the SBOX properties described above to enable further protection of the AEs process.

A. Mixing SBOX Properties and Mix Column Properties

1. First SBOX Property and AES Encryption

Figure 6:
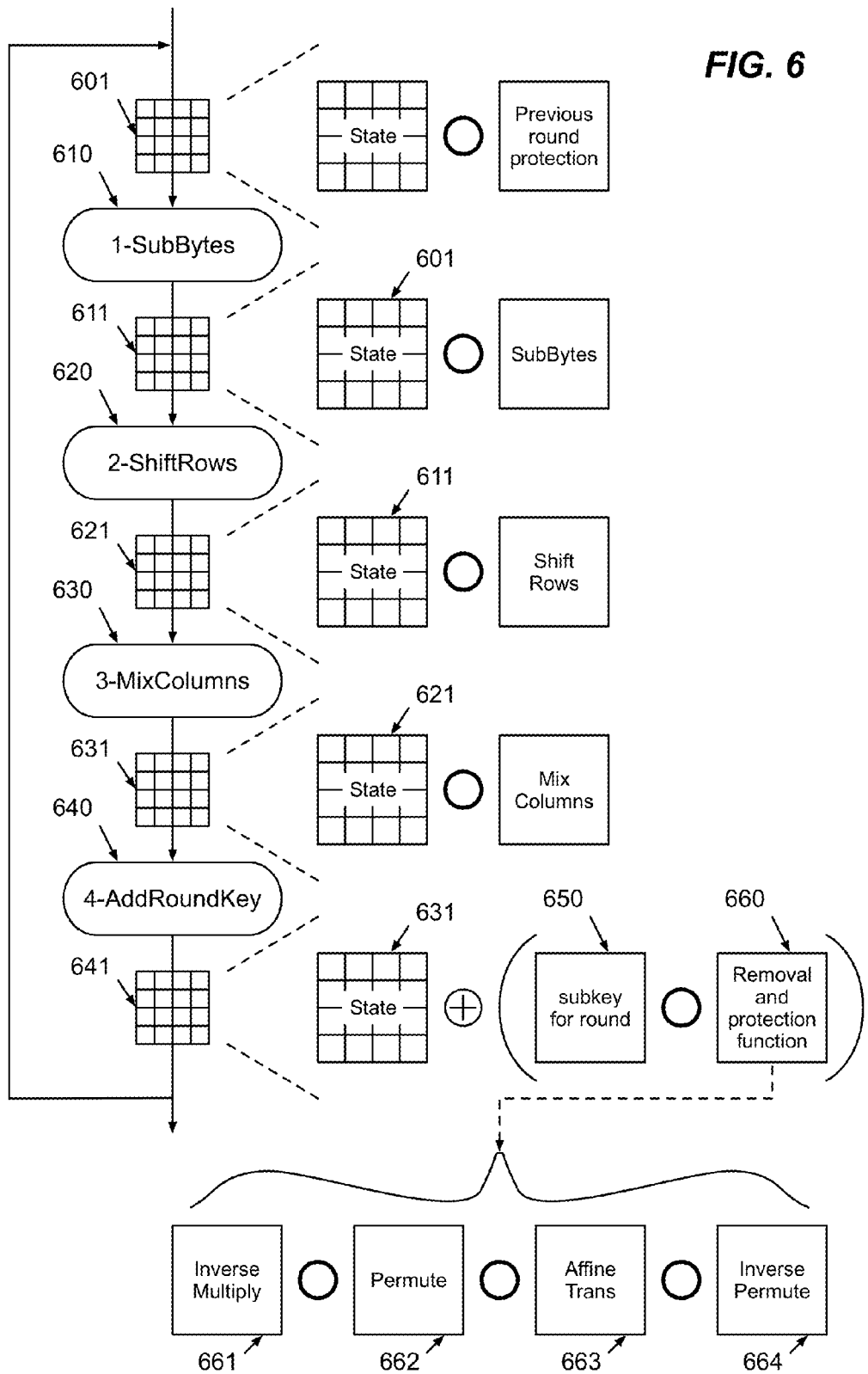
FIG. 6 conceptually illustrates an example round of protected AES processing according to some embodiments of the invention.

Embodiments of the invention combine the above described removal and application operations with the SBOX properties to provide protection for AES operations through all of the AES rounds. In order to assist in explaining these novel protection techniques, a conceptual illustration of the operations of AES in combination with these techniques is shown in FIG. 6. FIG. 6 shows an expanded view of the middle rounds of AES. Specifically, it shows AES state 601 being passed through and operated on by SubBytes 610, ShiftRows 620, MixColumns 630, and AddRoundKey 640. After each operation, AES state 601 will be altered by the operation. AES state 601 is referred to by different figure numbers 611, 621, 631, and 641 to indicate its changed values after each operation.

Assume that AES state 601 is initially protected with a multiplication M_(1/i). Some embodiments may provide different initial protection functions besides multiplication, such as permutations. After the SubBytes 610 step, AES state 611 is protected with the function (A∘M_i∘A$^{-1}$) in addition have to having a substitution operation applied according to the SBOX. The function (A∘M_i∘A$^{-1}$) is derived from the first SBOX property as described above in Section I.A.

After the MixColumns 630 step, the state 631 will be altered by SubBytes, ShiftRows, MixColumns, and will have the following protection function applied:

$$MC\circ(A\circ M\_i\circ A^{-1})\circ MC^{-1}$$

Recall from Section I.D above, the commutative properties of the SBOX can be generalized to MixColumns (i.e. MC). This protection is an affine operation on 4 bytes. State 631 will be operated on by the AddRoundKey 640 operation. The AddRoundKey function XOR's a subkey for a particular round into AES state 631 in order to generate AES state 641. However, AES state 631 includes the protection function MC∘(A∘M_i∘A$^{-1}$)∘MC$^{-1}$. To remove this protection function, it is necessary to apply the function:

$$MC\circ(A\circ M\_1/i\circ A^{-1})\circ MC^{-1}$$

However, in order to keep protection for the next AES round, it is necessary to apply the M_(1/i) function. Embodiments of the invention apply both simultaneously according to the following removal and protection function:

$$M\_1/i\circ MC\circ(A\circ M\_1/i\circ A^{-1})\circ MC^{-1}$$

This removal and protection function corresponds to removal and protection function 660. Some embodiments take advantage of the techniques described above regarding pre-computation of protection functions combined with round subkeys. As shown in FIG. 6, the subkey for the round 650 is composed with removal and protection function 660. Other embodiments embed removal and protection function 660 as a part of a different AES operation, such as a part of the MixColumns 630 operation. Removal and protection function 660 is a 4 byte transformation, similar to the MixColumns operation, and can be implemented using standard AES techniques in only 16 TLUs to transform all 16 bytes of the AES state.

Removal and protection function 660 is a composition of several functions. Specifically, Removal and protection function 660 includes an inverse multiplication 661, a permutation 662, an affine transformation 663, and an inverse permutation 664. The inverse multiplication 661 corresponds to "M_1/i". Different embodiments may use different mathematical protection functions. The permutation 662 corresponds to "MC". Some embodiments may use a different permutation function depending on how removal and protection function 660 is embedded within AES. However, the permutation must be a bijection. The affine transformation 663 corresponds to "(A∘M_1/i∘A$^{-1}$)". The inverse permutation 664 corresponds to "MC$^{-1}$". Together these functions remove a previous round's protection and apply a next round's protection. Thereby ensuring that the AES operations are never visible in the clear.

Figure 7:
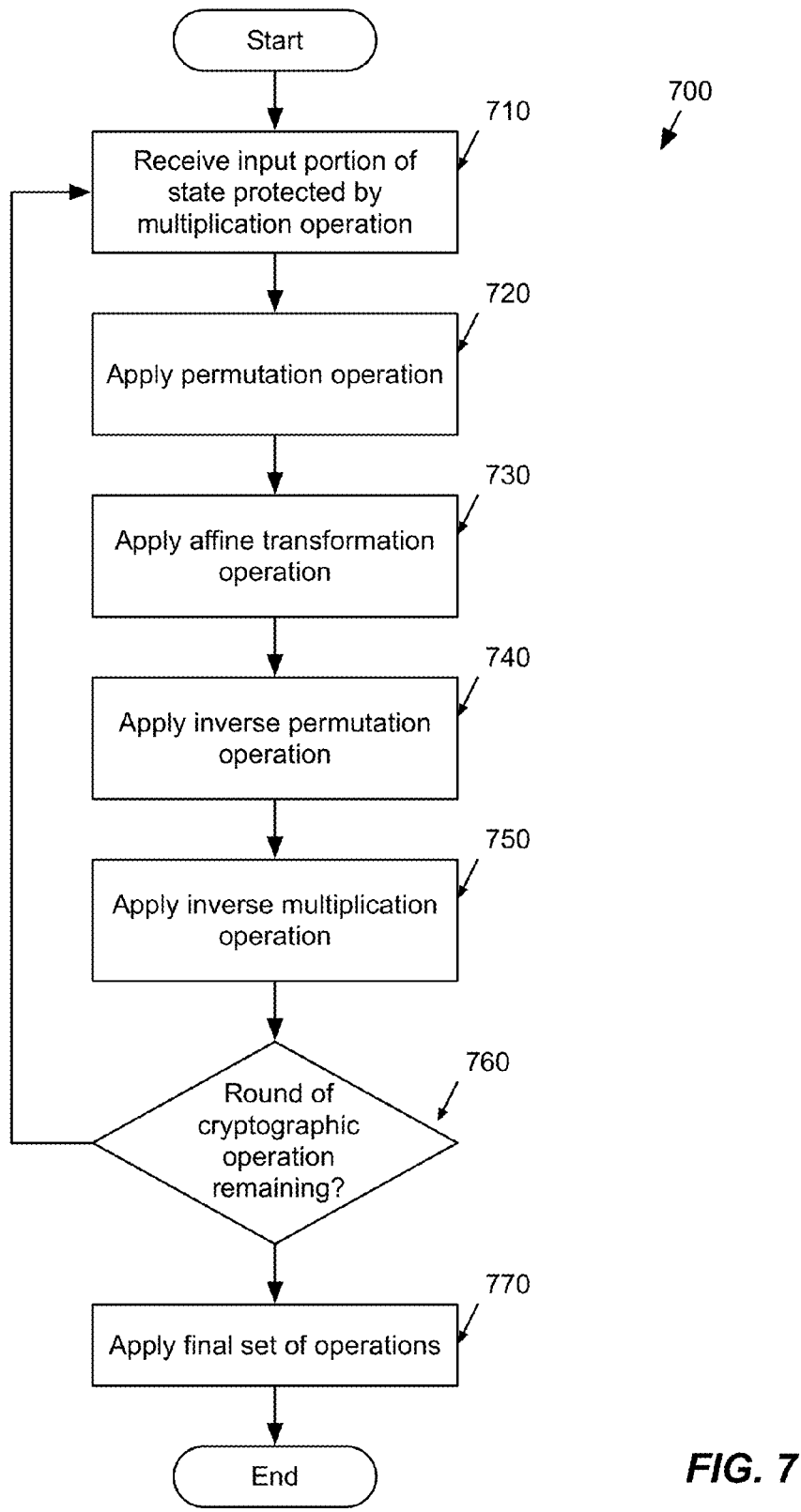
FIG. 7 conceptually illustrates a process for applying protected AES operations to AES state.

Some embodiments apply the previously described removal and protection function according to process 700 shown in FIG. 7. Process 700 is performed as a part of a software process executed by a device of some embodiments. Process 700 is performed at the point during the rounds of AES where a previous round's protection is removed and a next round's protection is applied. As mentioned above, the removal and protection function may be embedded in different AES operations in different embodiments of the invention.

Process 700 begins by receiving (at 710) an input portion of state protected by a multiplication operation. Some embodiments may use different protection than the multiplication operation. The process 700 then applies a series of operations to the input portion of state to generate a resulting state. In some embodiments, these operations (e.g., operations 720, 730, 740, 750) are all applied at once as part of a composition function. In said embodiments, this composition function comprises a series of table look ups that implement the operations. An example of such a composition function is removal and protection function 660 from FIG. 6. As shown in FIG. 6, removal and protection function 660 is composed of inverse multiplication 661, permutation 662, affine transformation 663, and inverse permutation 664.

Returning to FIG. 7, the process then 700 applies (at 720) a permutation operation. In some embodiments, the permutation operation is a MixColumns look up table operation. The process 700 then applies (at 730) an affine transform operation. In some embodiments, the affine transform operation removes a previous protection function applied during a SubBytes operation. Such an affine transform operation may take the form of "(A∘M_1/i∘A$^{-1}$)", where A is the affine transformation from the definition of the SBOX table and M_1/i is a multiplication operation. The process 700 then applies (at 740) an inverse permutation operation. When the permutation operation is a MixColumns look up table operation, the inverse permutation operation is an inverse-MixColumns operation (i.e., MC$^{-1}$). As mentioned above, this series of operations can be composed as a single operation that takes place over a series of table look ups.

Some embodiments may apply these operations in a different order than the one shown in process 700.

The process 700 then determines (at 760) whether another round of cryptographic operations remains. When the process 700 determines that another round is needed (such as after the initial round or after one of the nine middle rounds of AES), the process 700 returns the resulting state to be used in another round of operations. When the process 700 determines that no further rounds are necessary, the process 700 then applies a final set of operations 770. The final set of operations 770 corresponds to the operations of the final round from AES (e.g., SubBytes, ShiftRows, and AddRoundKey; but not MixColumns). In addition, the final set of operations 770 will remove the protections applied during process 700 and not replace them with further protections. The final resulting state will be the resulting state expected from standard AES. The process 700 is described in generic terms that apply to either encryption or decryption. However, further details regarding the protection of decryption operations as they relate to the SBOX table will be described in the section below.

2. Second SBOX Property and AES Decryption

The second SBOX property can be generalized to work with AES decryption. Assume that an AES state is protected with $(A \circ M\_i \circ A^{-1})$. As showed previously, after the ISBOX step, the state is protected with the function $M\_1/i$. If IMC (i.e. inverse MixColumns) is applied to the state protected with $M\_1/i$, then the resulting state will be protected with:

$$IMC \circ M\_1/i \circ IMC^{-1}$$

As stated above, MC and IMC commute with multiplication. Therefore, the eventual protection applied to the state will be:

$$M\_1/i$$

In order to maintain protection for the next AES round, it is necessary to apply the $(A \circ M\_i \circ A^{-1})$ function. These can both be applied simultaneously by applying:

$$(A \circ M\_i \circ A^{-1}) \circ M\_i.$$

The above transformation is a one byte transformation, similar to the SBOX table. 16 TLUs are sufficient to compute this transformation. Accordingly, some embodiments of the invention embed removal and protection functions (e.g., an inverse multiplication, a permutation, an affine transformation, and an inverse permutation) as a part of the SubBytes portion of AES decryption. Further modification to the SubBytes operation of AES decryption are described below.

3. Third SBOX Property and AES Decryption

The third SBOX property can be used to generate multiple SBOX tables for use in AES decryption. Let P be a linear permutation that protects the subkeys and the AES tables (SBOX and MC). This will result in any value in the process being protected by the linear permutation P. This means that if X would have been a value computed in the normal AES, it would be protected by P[X] in the whitebox implementation of the AES. To take advantage of this protection, SBOX can be modified and stored in memory as SBOX_P, the conjugate of SBOX by P. This means, for all X:

$$SBOX\_P[X]=P[SBOX[P^{-1}[X]]]$$

In other words, P and $P^{-1}$ form conjugacy class functions for SBOX and SBOX_P. $P^{-1}$ is the inverse of the linear permutation P. This means that for all X, $P[P^{-1}[X]]=P^{-1}[P[X]]=X$. Now define $SBOX"\_i\_P[X]=P[SBOX"\_i[P^{-1}[X]]]$. One can see that:

$$(SBOX\_P)^i=SBOX"\_i\_P$$

This is true because the P and $P^{-1}$ simplify when one computes $SBOX\_P^i$. Thanks to this property, $SBOX"\_i\_P$ can be used in an AES process in combination with a linear permutation. Accordingly, some embodiments of the invention generate several SBOX tables according to the third SBOX property and can combine these tables with linear permutations for enhanced security. Having discussed several embodiments of AES protection schemes, the following section will discuss novel techniques for increasing the execution speed and efficiency of such AES protection schemes.

III. Alternating Software and Hardware Processing

The techniques described above provide protection for AES operations. However, typical hardware cryptography devices (e.g., cryptography ASICs) cannot be modified to include such protection functions. For instance, an AES encryption core receives plaintext input with a key and outputs cipher text. However, the AES encryption core provides no ability for a user to modify its AES tables. Accordingly, some embodiments of the invention divide cryptographic operations between software and hardware processing to enable protected operations in software processing and fast, yet still protected, operations in hardware processing.

Figure 8:
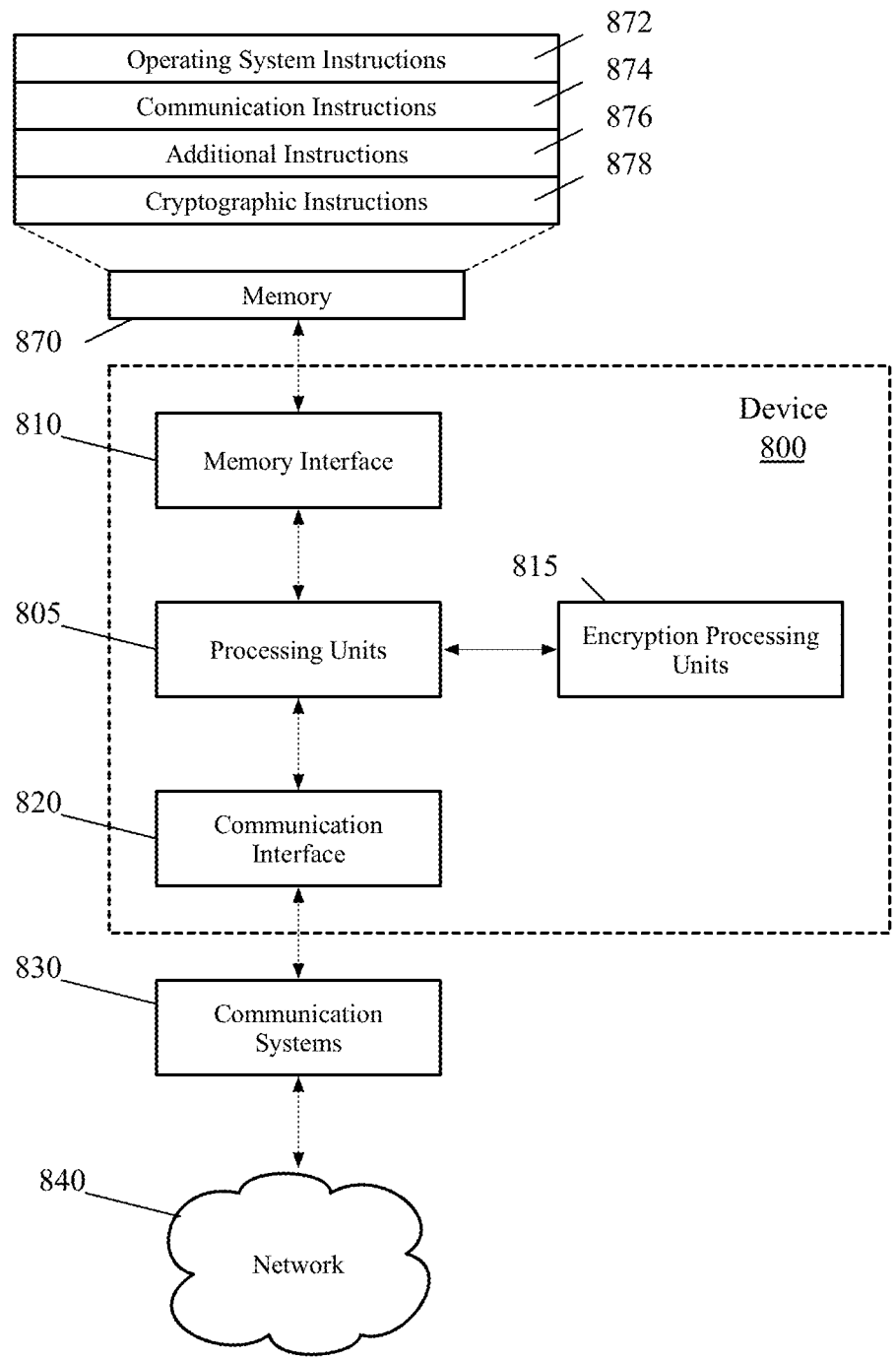
FIG. 8 conceptually illustrates a device that performs alternating hardware and software AES processing of some embodiments.

FIG. 8 conceptually illustrates a device 800 of some embodiments that implements such a bifurcated processing. Device 800 may be any of a number of computing devices that perform AES operations, such as a personal computer, a smartphone, a tablet, a server that provides data encrypted with AES, etc. Device 800 includes processing units 805, memory interface 810, encryption processing units 815, and communication interface 820. Communication interface 820 enables communication with other devices through communication systems 830 and network 840.

Processing units 805 can be any of central processing units ("CPUs"), arithmetic logic units ("ALUs"), network processing units ("NPUs"), CPU cores, etc. Processing units 805 perform the operations necessary to run device 800. In some embodiments, processing units 805 perform the described protected AES operations as software processes based on instructions stored in memory 870.

Processing units 805 access memory 870 through memory interface 810. The memory interface 810 is coupled to memory 870. In some embodiments, the memory 870 includes volatile memory (e.g., high-speed random access memory), non-volatile memory (e.g., flash memory), a combination of volatile and non-volatile memory, and/or any other type of memory. Memory 870 includes several stored computer instructions. Such computer instructions include operating system instructions 872, communication instructions 874, additional instructions 876, and cryptographic instructions 878.

Operating system instructions 872 include instructions for handling basic system services and for performing hardware dependent tasks. Communication instructions 874 include instructions for facilitating communication with one or more additional device and communications across networks. The additional instructions 876 include various other instructions that may be stored in the memory of such a device 800, including UI instructions (e.g., for a user device), other applications, etc. Cryptographic instructions 878 include instructions and data for performing AES operations. In addition, cryptographic instructions 878 include the modified tables used to perform the protected AES operations of some embodiments. When performing protected AES operations, processing units 805 will refer to the tables, data, and instructions of cryptographic instructions 878. In some embodiments, cryptographic instructions 878 will direct processing units 805 to transmit data to encryption processing units 815 for hardware cryptographic processing.

Encryption processing units 815 perform hardware cryptographic processing using specially designed processors that are optimized for cryptographic processing. Such processors can include AES cores, ASICs, secure crypto processors, etc. In contrast to processing units 805, encryption processing units 815 cannot refer to tables in memory 870. Instead, encryption processing units 815 rely on pre-programmed instructions locally cached (not shown) with the encryption processing units 815. When encryption processing units 815 receive input data (e.g., AES state and key data) from processing units 805, encryption processing units 815 will apply a cryptographic operation (e.g., a round of AES) on the input data and return output data (e.g., AES state) to processing units 805. Provided the input data received by encryption processing units 815 is protected by the protection functions of some embodiments of the invention, it will not matter that encryption processing units 815 lack any modified tables. The output produced from the protected input will remain protected.

While the components illustrated in FIG. 8 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 8 may be split into two or more integrated circuits.

Figure 9:
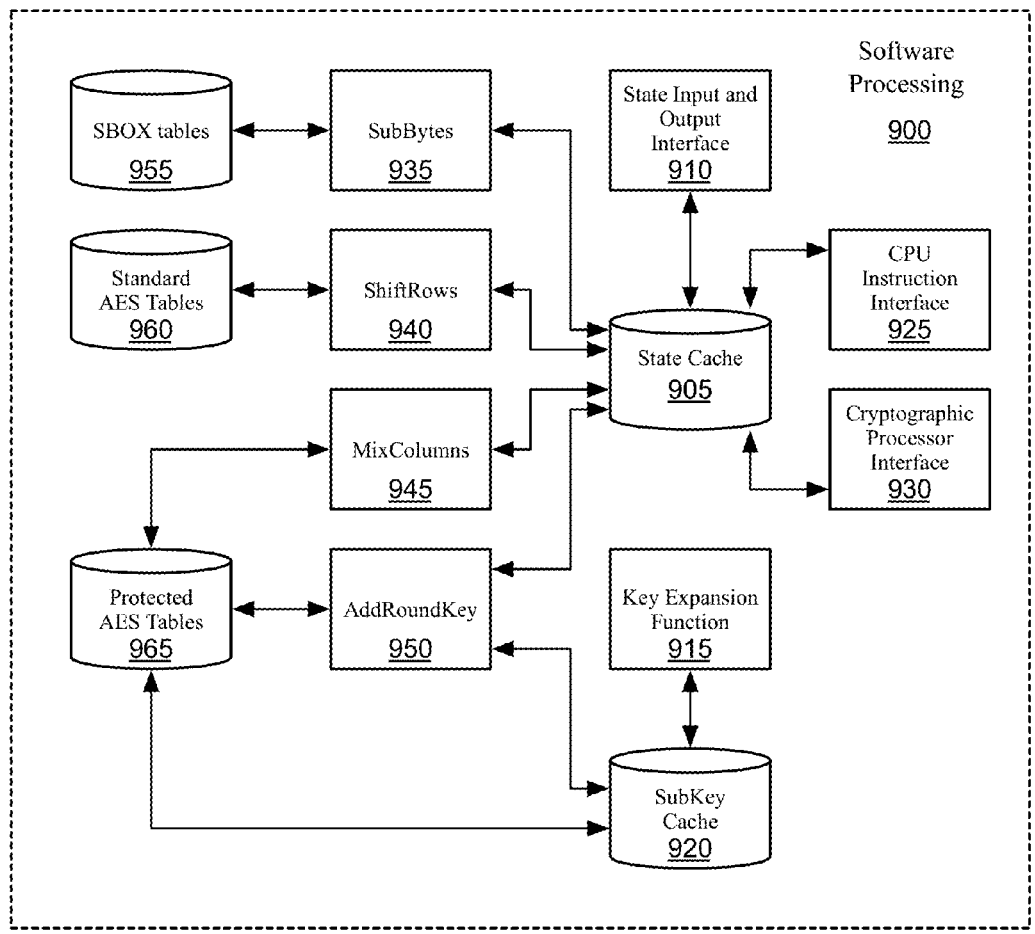
FIG. 9 conceptually illustrates a software processing modular diagram of some embodiments.

FIG. 9 conceptually illustrates the software modules of software processing 900. In some embodiments, software processing 900 is the software processing performed by a device similar to device 800 of FIG. 8. Software processing 900 includes several functional modules and caches. The functional modules include state input and output interface 910, key expansion function 915, CPU instructions interface 925, cryptographic processor interface 930, SubBytes 935, ShiftRows 940, MixColumns 945, AddRoundKey 950. In some embodiments, these functional modules are conceptual illustrations of functional blocks of computer code. The several caches include state cache 905, subkey cache 920, SBOX tables 955, standard AES tables 960, and protected AES tables 965. The several caches are conceptual illustrations of variables and blocks of memory of computer code, and in different embodiments may be stored in memory (e.g., RAM), a processor cache, etc.

The state cache 905 stores AES state as the AES state is processed by AES operations. For instance, when AES state is passed between rounds, or between hardware and software processing, the state cache 905 will store said AES state. The state cache 905 initially receives AES state from the state input and output interface 910.

The state input and output interface 910 receives and transmits data that will be used as AES state by software processing 900. The state input and output interface 910 may receive this data from another device, or from another process running on the device that is executing software processing 900. Once software processing 900 completes processing of a particular unit of AES state (e.g., a block of data on which the AES cryptographic operation is performed), the state input and output interface 910 will transmit the finished ciphertext or plaintext to other devices or other processes on the device executing software processing 900.

In order to execute AES operations, software processing 900 will transmit AES state and key information to CPU instruction interface 925. CPU instruction interface 925 transmits instructions and receives computation results from the CPUs of the device executing software processing 900. In some embodiments, the CPU instruction interface 925 may interface with processing units of a different type than CPUs, such as ALUs. In embodiments of the invention that perform AES by alternating rounds of software processing and hardware processing, software processing 900 will also transmit AES state and key information to cryptographic processor interface 930. Cryptographic processor interface 930 transmits data and key information to cryptographic processing units (e.g., AES cores, ASICs, secure crypto processors). The cryptographic processor interface 930 may also transmit certain flag information for limited control over the cryptographic processing units. Cryptographic processor interface 930 also receives data (e.g., ciphertext or plaintext output) from the cryptographic processing units of the device executing software processing 900.

Software processing 900 enables the application of AES cryptographic operations to state received at the state input and output interface 910. The AES state in the state cache 905 is operated upon by SubBytes 935, ShiftRows 940, MixColumns 945, and AddRoundKey 950. The SubBytes 935, ShiftRows 940, MixColumns 945, and AddRoundKey 950 modules each perform their respective operations described above.

SubBytes 935 accesses SBOX tables 955 in order to perform substitution operations on AES state. In some embodiments, SBOX tables 955 store sequences of SBOX tables from which SubBytes 935 will select first, second, and base tables to use in performing substitution operations on AES state. When SubBytes 935 is performing standard AES substitutions, then SubBytes 935 will use the standard SBOX table (e.g., as shown in FIG. 3).

ShiftRows 940 performs the shift row operations on AES state (e.g., rotating the bits of various rows of AES state different amounts). As shown in FIG. 9, in some embodiments ShiftRows 940 accesses tables in standard AES tables 960. In some various embodiments, ShiftRows 940, MixColumns 945, or AddRoundKey 950 may access either standard AEs tables 960 or protected AES tables 965. In the embodiment shown in FIG. 9, ShiftRows 940 uses standard tables where as MixColumns 945 and AddRoundKey 950 access protected AES tables 965. Different embodiments may use different combinations of using protected and standard AES tables (e.g., the entire protection scheme may be applied as a table XOR'ed into the subkey for a particular round in the AddRoundKey 950 operation as shown in FIG. 6).

MixColumns 945 combines various columns of the AES state using XOR operations according to look up tables in the protected AES tables 965. As mentioned above, in some embodiments, MixColumns 945 may use standard tables from AES tables 960. The protected AES tables 965 include protection functions that both apply and remove protection during each round of AES (e.g., the function $M\_1/i \circ MC \circ (A \circ M\_1/i \circ A^{-1}) \circ MC^{-1}$ as described above in connection with FIG. 7).

AddRoundKey 950 XOR's a subkey from subkey cache 920 into AES state. In embodiments where protection functions are applied and removed during the AddRoundKey 950 operation, AddRoundKey 950 will use protected tables generated from compositions of subkeys and AES protection functions (as described above in conjunction with FIG. 6). These protected tables will be pre-computed as compositions between the subkeys and the AES protection functions. The pre-computed tables will be XOR'ed into AES state in order to apply both the round key and the protection and removal functions to the AES state.

Key expansion function 915 generates subkeys for use in the rounds of AES. In standard AES, 11 subkeys will be generated for use in 11 AddRoundKey 950 operations (as shown above in connection with FIG. 1). The generated subkeys will be stored in subkey cache 920 for access by AddRoundKey 950. Having described the software processing of some embodiments of the invention, the next figure will describe how hardware components distribute the alternating rounds of AES operations of some embodiments.

Figure 10:
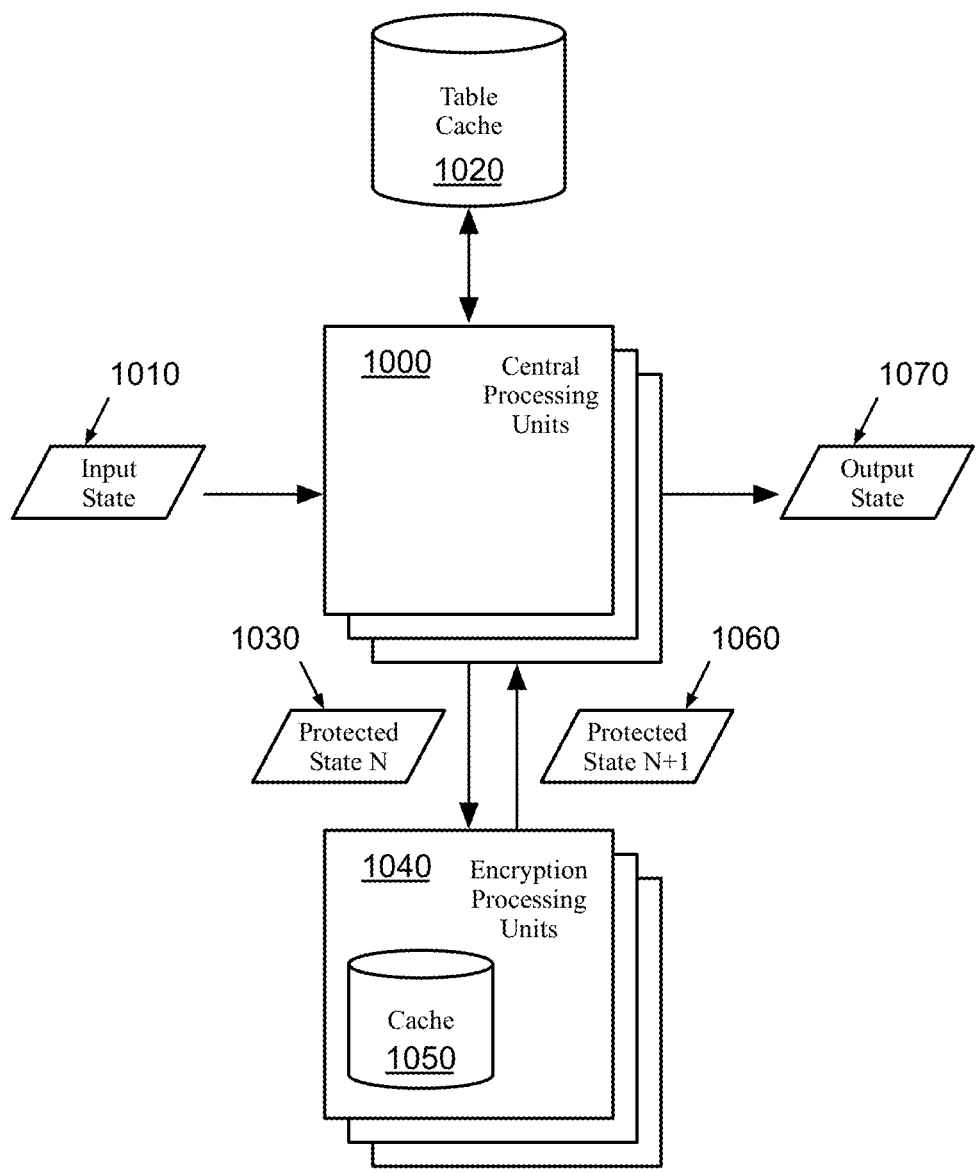
FIG. 10 conceptually illustrates a hardware diagram of some embodiments.

FIG. 10 conceptually illustrates central processing units 1000 and encryption processing units 1040 exchanging AES state information while performing alternating AES processing. Central processing units 1000 are shown receiving input state 1010. Central processing units 1000 can be any of CPUs, ALUs, NPUs, CPU cores, etc. Input state 1010 can be a song, a video, a document, a message, or any other bit-encodable data that needs to be encrypted or decrypted (or a portion of such data). Central processing units 1000 perform the software processing of some embodiments described above on input state 1010 (e.g., the protected SubBytes, AddRoundKey, and/or MixColumns operations). Central processing units 1000 will refer to table cache 1020 in performing protected AES operations on input state 1010. The resulting state will be protected state N 1030. Protected state N 1030 represents AES state that has been operated on by central processing units 1000 based on protected AES operations defined by tables in table cache 1020, after a particular (Nth) round of AES.

Encryption processing units 1040 perform hardware cryptographic processing using specially designed processors that are optimized for cryptographic processing. Such processors can include AES cores, ASICs, secure crypto processors, etc. In contrast to central processing units 1000, encryption processing units 1040 do not refer to tables in the table cache 1020. Instead, encryption processing units 1040 rely on pre-programmed instructions locally cached in cache 1050. When encryption processing units 1040 receive input data (e.g., protected state N 1030) from central processing units 1000, encryption processing units 1040 will apply a cryptographic operation (e.g., a round of AES) on the input data and return protected state N+1 1060 to central processing units 1000. Protected state N+1 1060 is received by central processing units 1000, which can then perform an additional protected round of AES (removing the protection from round N while adding new protection in round N+2). If round N+2 is the final round of processing, then the central processing units 1000 only remove the current protection, and do not add additional protection. Central processing units 1000 and encryption processing units 1040 will alternate between processing the state until central processing units 1000 generate a final output state 1070.

Figure 11:
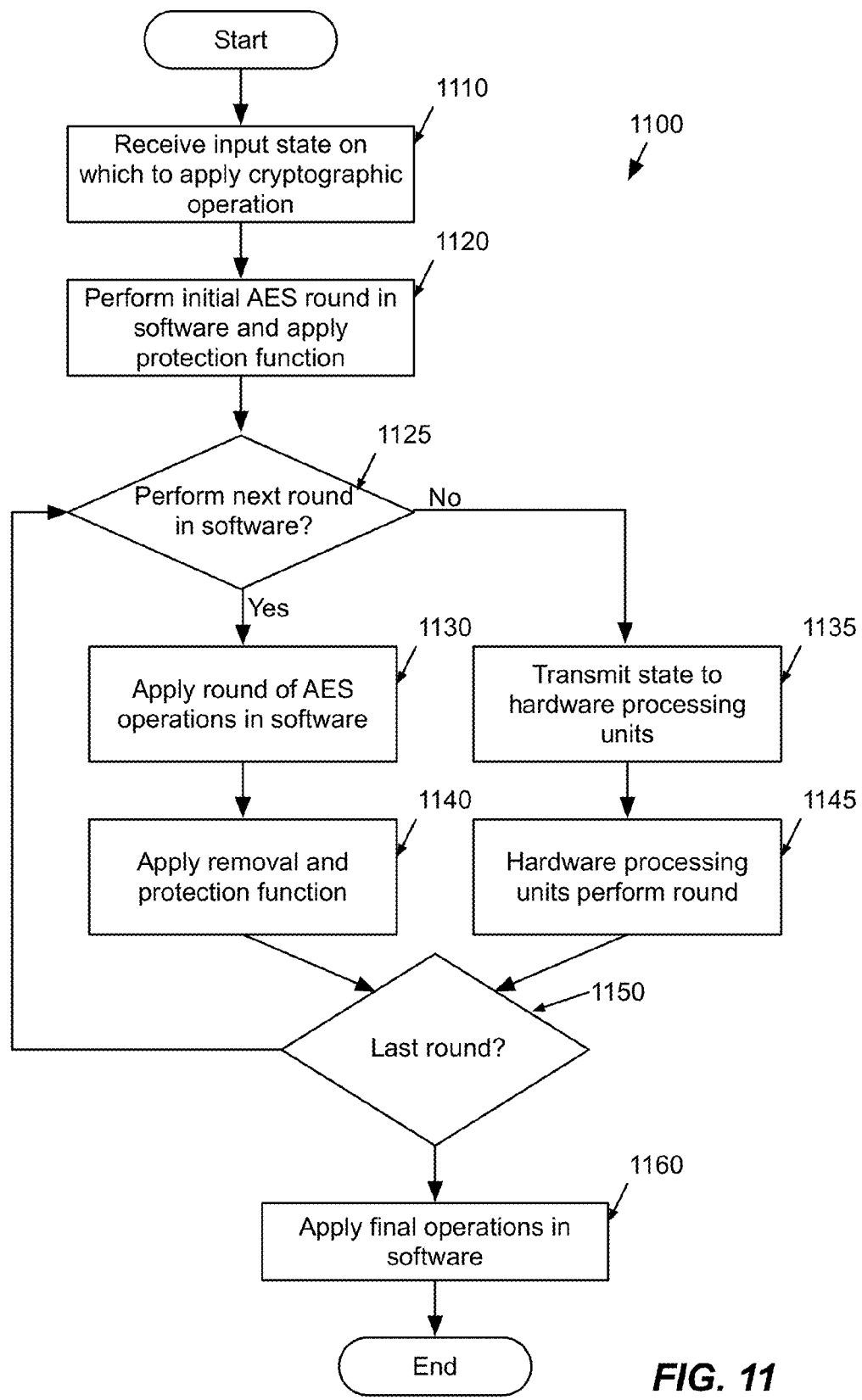
FIG. 11 conceptually illustrates a process for performing alternating hardware and software AES processing of some embodiments.

FIG. 11 conceptually illustrates a process 1100 for dividing processing of protected AES operations between hardware and software processing resources. In some embodiments, process 1100 is performed by a device similar to device 800 of FIG. 8. Process 1100 begins by receiving (at 1110) input state on which to apply a cryptographic operation. This input state could be a song, a video, a document, a message, or any other bit-encodable data that needs to be encrypted or decrypted. The cryptographic operation to be applied can be encryption or decryption. The process 1100 then performs (at 1120) an initial AES round in software and applies a protection function to the input state. In some embodiments, this initial AES round will comprise only the AddRoundKey function applying subkey 0 to the input state along with a protection function. The protection function of some embodiments can be any of multiplication, addition, masks, permutations, etc.

The process then determines (at 1125) whether to perform the next round in software. In some embodiments, process 1100 alternates between software and hardware rounds. The example processing of input state shown in FIG. 2 uses alternating software and hardware rounds. Other embodiments may use a different pattern of hardware and software rounds.

When the next round is to be performed in software, the process applies (1130) a round of AES operations in software (i.e., using software instructions executed by a general purpose processor). A middle round of AES operations will perform a SubBytes operation, a ShiftRows operation, a MixColumns operation, and an AddRoundKey operation. When used herein, the phrase "in software" means performed using standard processing units of the device performing process 1100. The process 1100 then applies (at 1140) a removal and protection function. In some embodiments, this removal and protection function may take the form of (when the protection function is multiplication):

$$M\_1/i \circ MC \circ (A \circ M\_1/i \circ A^{-1}) \circ MC^{-1}$$

This function will remove a previous round's protection and apply a next round's protection. When the next round is to be performed in hardware, the process transmits (1135) the state to the hardware processing units. The transmitted state will retain the protection functions applied in the software rounds. However, the hardware processing units will not treat the protected state differently from unprotected state. As discussed above, hardware processing units can be any of AES cores, ASICs, secure crypto processors, etc. The hardware processing units then perform (at 1145) a round of AES operations.

The process then determines (at 1150) whether the process has reached the last round. In a standard AES encryption operation, 11 rounds are performed in total: one initial round, nine middle rounds, and one final round. When the last middle round has completed, the process applies (at 1160) the final round of operations in software. In AES encryption, the final round of operations will include a SubBytes operation, a ShiftRows operation, and an AddRoundKey operation. In addition, the final round of operations will apply a removal function that removes any protections applied during the previous rounds. This will result in a final output state. Depending on the cryptographic operation performed by process 1100, the final output state may be ciphertext (encryption) or plaintext (decryption).

The above description refers repeatedly to AES-specific operations. However, one of ordinary skill in the art will recognize that the inventions described herein may be applied to other round-based cryptographic functions in some embodiments, and are not necessarily limited to only AES operations.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 12:
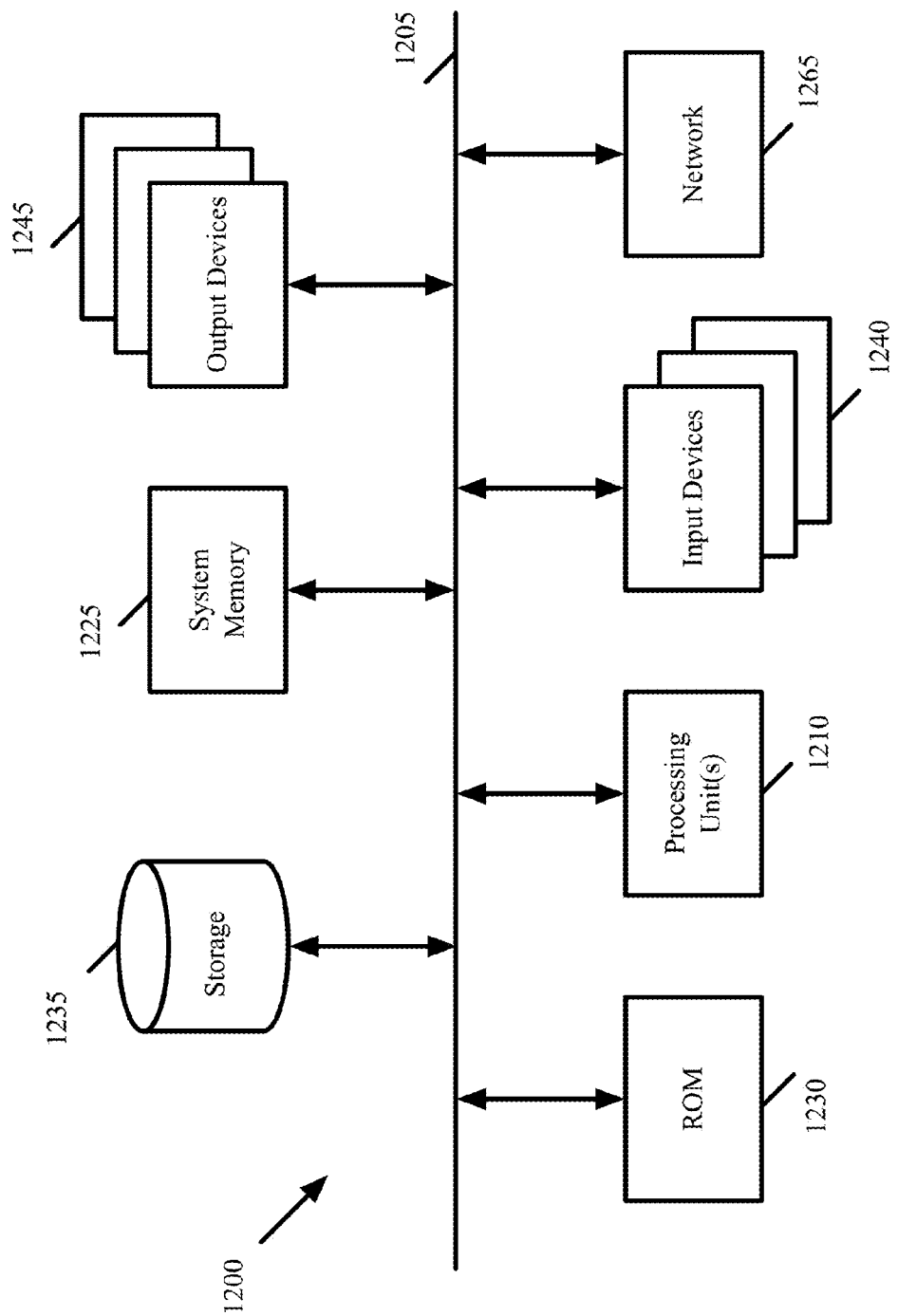
FIG. 12 conceptually illustrates an electronic system with which some embodiments of the invention are implemented.

FIG. 12 conceptually illustrates an electronic system 1200 with which some embodiments of the invention are implemented. The electronic system 1200 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1200 includes a bus 1205, processing unit(s) 1210, a system memory 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the system memory 1225, and the permanent storage device 1235.

From these various memory units, the processing unit(s) 1210 retrieves instructions to execute and data to process in order to execute the processes of the invention. The processing unit(s) may be a single processor or a multi-core processor in different embodiments.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive) as the permanent storage device 1235.

Other embodiments use a removable storage device (such as a floppy disk, flash memory device, etc., and its corresponding drive) as the permanent storage device. Like the permanent storage device 1235, the system memory 1225 is a read-and-write memory device. However, unlike storage device 1235, the system memory 1225 is a volatile read-and-write memory, such a random access memory. The system memory 1225 stores some of the instructions and data that the processor needs at runtime. In some embodiments, the invention's processes are stored in the system memory 1225, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1265 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "arithmetic logic unit", "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 7, 5, and 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for performing a block cryptographic process, the method comprising:
   receiving an input portion of cryptographic state that has been protected by a protection function;
   applying a cryptographic operation to the input portion over a series of rounds, wherein the rounds alternate between applying the cryptographic operation using a software process and applying the cryptographic operation using a hardware process, and wherein the cryptographic operation when applied during the software process rounds comprises a composition of:
   a permutation operation;
   a substitution operation; and
   an inverse permutation operation to enable subsequent processing by a hardware process round.

2. The method of claim 1, wherein the protection function is a multiplication operation.

3. The method of claim 1, wherein the cryptographic operation applied during the software process rounds removes a protection function of a previous round and applies a next round's protection function.

4. The method of claim 1, wherein a central processing unit performs the software process and a specialized cryptographic processor performs the hardware process.

5. The method of claim 4, wherein the cryptographic processor is one of an AES core, an ASIC, and a secure crypto processor.

6. The method of claim 1, wherein the cryptographic operation applied using the hardware process comprises a standard cryptographic operation without additional operations.

7. The method of claim 6, wherein the cryptographic operation applied using the hardware process is protected by a protection function applied by the software process.

8. A non-transitory machine readable medium storing a program which when executed by at least one processing unit performs a block cryptographic process applied over a series of rounds, the program comprising sets of instructions for:
   receiving an input portion of cryptographic state that has been protected by a protection function; and
   applying a cryptographic operation to the input portion during software process rounds comprising a composition of:
   a permutation operation;
   a substitution operation; and
   an inverse permutation operation to enable subsequent processing by a hardware process round,
   wherein the rounds alternate between applying the cryptographic operation using the software process and applying the cryptographic operation using a hardware process.

9. The non-transitory machine readable medium of claim 8, wherein the protection function is a multiplication operation.

10. The non-transitory machine readable medium of claim 8, wherein the set of instructions for applying the cryptographic operation during the software process rounds further comprises a set of instructions for removing a protection function of a previous round and applying a next round's protection function.

11. The non-transitory machine readable medium of claim 8, wherein a central processing unit performs the software process and a specialized cryptographic processor performs the hardware process.

12. The non-transitory machine readable medium of claim 11, wherein the cryptographic processor is one of an AES core, an ASIC, and a secure crypto processor.

13. The non-transitory machine readable medium of claim 11, wherein the cryptographic operation applied using the hardware process comprises a standard cryptographic operation without additional operations.

14. The non-transitory machine readable medium of claim 13, wherein the cryptographic operation applied using the hardware process is protected by a protection function applied by the software process.

15. A device comprising:
   a set of processing units;
   a non-transitory machine readable medium storing a program which when executed by at least one processing unit in the set of processing units performs a block cryptographic process applied over a series of rounds, the program comprising sets of instructions for:
   receiving an input portion of cryptographic state that has been protected by a protection function; and
   applying a cryptographic operation to the input portion during software process rounds, wherein the rounds alternate between applying the cryptographic operation using the software process and applying the cryptographic operation using a hardware process, wherein the software process rounds comprise a composition of:
   a permutation operation;
   a substitution operation; and
   an inverse permutation operation to enable subsequent processing by a hardware process round; and
   a cryptographic processor for performing the hardware process rounds.

16. The device of claim 15, wherein the protection function is a multiplication operation.

17. The device of claim 15, wherein the set of instructions for applying the cryptographic operation during the software process rounds further comprises a set of instructions for removing a protection function of a previous round and applying a next round's protection function.

18. The device of claim 15, wherein the cryptographic processor is one of an AES core, an ASIC, and a secure crypto processor.

19. The device of claim 15, wherein the cryptographic operation applied using the hardware process comprises a standard cryptographic operation without additional operations.

20. The device of claim 19, wherein the cryptographic operation applied using the hardware process is protected by a protection function applied by the software process.

\* \* \* \* \*